S. MYERSON.
ARTIFICIAL TOOTH.
APPLICATION FILED APR. 17, 1918. RENEWED APR. 7, 1919.
1,320,337. Patented Oct. 28, 1919.
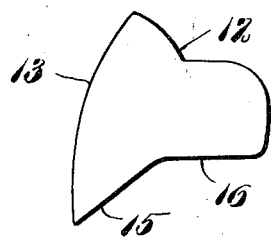
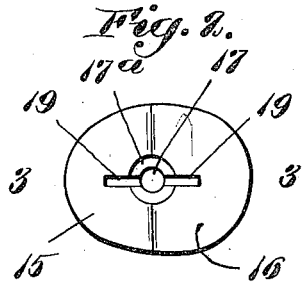
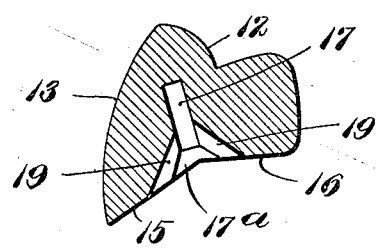
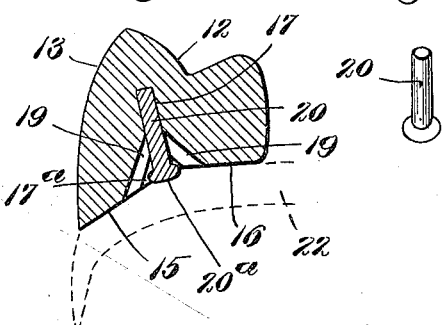
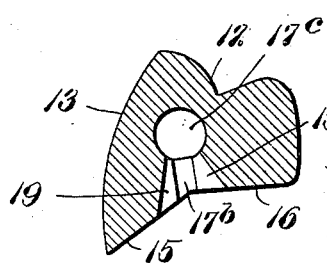
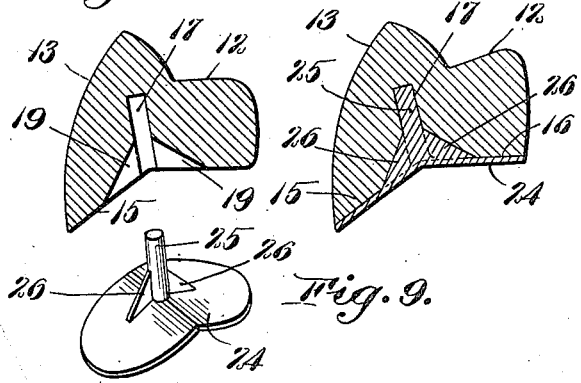
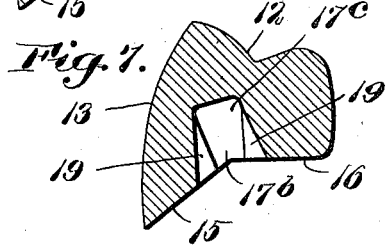

UNITED STATES PATENT OFFICE.

SIMON MYERSON, OF CAMBRIDGE, MASSACHUSETTS.

ARTIFICIAL TOOTH.

1,320,337.  Specification of Letters Patent.  Patented Oct. 28, 1919.

Application filed April 17, 1918, Serial No. 229,033. Renewed April 7, 1919. Serial No. 288,222.

*To all whom it may concern:*

Be it known that I, SIMON MYERSON, a citizen of the United States, residing at Cambridge, in the county of Middlesex and State of Massachusetts, have invented new and useful Improvements in Artificial Teeth, of which the following is a specification.

The object of this invention is to provide an artificial tooth of wide general adaptability, but particularly adapted for the very troublesome class of cases known as "short bite" cases. The tooth of my invention is particularly designed for molar and bicuspid teeth, and is useful in cases where a plastic medium, such as vulcanite formed as a plate, is used as a support, and also for cases where a non-plastic medium, such as metal, is used, the metal being for example, a bridge.

The invention is embodied in the improvements which I will now proceed to describe and claim.

Of the accompanying drawings forming a part of this specification,—

Figure 1 is a side view of an artificial tooth embodying the invention.

Fig. 2 is a plan view of the same, looking toward the support-engaging surface.

Fig. 3 is a section on line 3—3 of Fig. 2.

Fig. 4 is a view similar to Fig. 3, showing in section, a headed pin engaged with the tooth, and by dotted lines a portion of a vulcanite plate engaged with the tooth and pin.

Fig. 5 is a perspective view of the pin shown by Fig. 4.

Figs. 6 and 7 are sectional views of a tooth having a socket, the inner portion of which is enlarged.

Fig. 8 is a sectional view of a tooth adapted to be engaged with a metallic support.

Fig. 9 is a perspective view of a member including a backing and a pin adapted for use with the tooth shown by Fig. 8.

Fig. 10 is a sectional view, showing the backing and pin illustrated by Fig. 9, engaged with the tooth illustrated by Fig. 8.

The same reference characters indicate the same parts in all of the figures.

My improved tooth includes an occlusal portion 12, a buccal portion 13, and a base portion having a reëntrant support-engaging surface composed of two faces 15 and 16, angularly arranged relatively to each other. 17 represents a socket opening on the reëntrant surface at the junction of the faces 15 and 16, thereof, and extending into the body of the tooth, the longitudinal axis of said socket being preferably inclined relatively to each of said faces.

At opposite sides of the socket 17 are slots 19, opening into the socket and on the faces 15 and 16.

In the embodiment of the invention shown by Figs. 2, 3, 4 and 5, the mouth portion of the socket 17 has a countersunk enlargement $17^a$, which accommodates the head $20^a$ of a metal pin 20 inserted and cemented in the socket. The inner side of the head $20^a$ is preferably spaced from the enlargement $17^a$, as shown by Fig. 4. The head $20^a$ is adapted to engage a portion of the material of a support, such as a vulcanite plate 22, made from plastic material, portions of the material while in the plastic condition, being pressed into the slots 19 to form slot-engaging tenons integral with the plate 22 and other portions being pressed into the space between the head $20^a$ and the enlargement $17^a$, the result being a secure anchorage of the tooth to the plate when the latter becomes rigid. The tenon portions of the plate material entering the slots 19, resist strains tending to turn the tooth on the pin 20.

In the embodiment of the invention shown by Figs. 6 and 7, the socket includes a reduced mouth portion $17^b$ and an inner portion $17^c$ of greater diameter than the mouth portion, said inner portion receiving some of the plastic plate material and being interlocked therewith when the material hardens.

The oppositely disposed slots 19, in this embodiment of the invention, extend well into the enlarged portion $17^c$, and serve as vents for the inclosed air when the plastic material is forced into the socket, thereby obviating the necessity of the usual side holes in this class of teeth.

When the tooth is to be attached to a metal support, such as a bridge, the socket enlargement $17^a$ may be omitted, as shown by Fig. 8, a metal backing 24 of angular form being provided, said backing being adapted to fit the faces 15 and 16. With the backing, as shown by Fig. 9, is formed a pin 25 and two oppositely projecting tenons 26, the pin being inserted in a socket 17, and the tenons in the slots 19, as shown by Fig.

10. The backing 24 may be secured in any suitable way to a metal support, such as a bridge.

I claim:

1. An artificial tooth having an occlusal portion, a buccal portion, a base portion having a support-engaging surface, a socket opening on the central portion of said surface, and oppositely disposed slots opening into said socket and upon said surface and formed to receive tenons on a backing, said slots constituting air vents when the backing is formed from plastic material.

2. An artificial tooth having an occlusal portion, a buccal portion, a base portion having a reëntrant support-engaging surface composed of two faces angularly arranged relatively to each other, a socket opening on the central portion of said surface, oppositely disposed slots opening into said socket and upon said faces, and a pin secured in said socket and forming a portion of a tooth support, said pin and socket being formed at their outer ends to permit the anchorage of the pin in a support formed from plastic material.

3. An artificial tooth having an occlusal portion, a buccal portion, a base portion having a reëntrant support-engaging surface composed of two faces angularly arranged relatively to each other, a socket opening on the central portion of said surface, the mouth portion of said socket being countersunk to form an enlargement, and a pin secured in said socket and having a support-engaging head spaced from said enlargement.

In testimony whereof I have affixed my signature.

SIMON MYERSON.

Copies of this patent may be obtained for five cents each, by addressing the "Commissioner of Patents. Washington, D. C."